(12) United States Patent
Nahrgang

(10) Patent No.: US 12,423,431 B2
(45) Date of Patent: Sep. 23, 2025

(54) ESTABLISHING TRUST BETWEEN APPLICATIONS IN A COMPUTING ENVIRONMENT

(71) Applicant: The ADT Security Corporation, Boca Raton, FL (US)

(72) Inventor: Kyle Patrick Nahrgang, Phoenixville, PA (US)

(73) Assignee: The ADT Security Corporation, Boca Raton, FL (US)

( * ) Notice: Subject to any disclaimer, the term of this patent is extended or adjusted under 35 U.S.C. 154(b) by 527 days.

(21) Appl. No.: 17/885,236

(22) Filed: Aug. 10, 2022

(65) Prior Publication Data

US 2023/0049508 A1    Feb. 16, 2023

Related U.S. Application Data

(60) Provisional application No. 63/232,518, filed on Aug. 12, 2021.

(51) Int. Cl.
| | | |
|---|---|---|
| *G06F 21/57* | (2013.01) | |
| *G06F 21/44* | (2013.01) | |
| *G06F 21/60* | (2013.01) | |
| *G06F 21/64* | (2013.01) | |

(52) U.S. Cl.
CPC .......... *G06F 21/575* (2013.01); *G06F 21/44* (2013.01); *G06F 21/602* (2013.01); *G06F 21/64* (2013.01); *G06F 2221/033* (2013.01)

(58) Field of Classification Search
CPC ...... G06F 21/575; G06F 21/44; G06F 21/602; G06F 21/64; G06F 2221/033
See application file for complete search history.

(56) References Cited

U.S. PATENT DOCUMENTS

| | | | | |
|---|---|---|---|---|
| 8,578,467 | B2* | 11/2013 | Ronda ................. | H04L 63/0853 713/172 |
| 8,619,971 | B2* | 12/2013 | Kurien .................... | G06F 21/57 726/36 |
| 11,461,146 | B2* | 10/2022 | Yao ........................... | G06F 21/74 |
| 11,687,645 | B2* | 6/2023 | Chen ........................ | G06F 21/44 726/22 |
| 2004/0226020 | A1* | 11/2004 | Birmingham ....... | G06F 9/45537 719/310 |
| 2005/0132229 | A1* | 6/2005 | Zhang ..................... | H04L 63/20 726/4 |
| 2013/0117561 | A1* | 5/2013 | Chawla ................... | H04L 63/04 713/158 |
| 2013/0191643 | A1* | 7/2013 | Song ...................... | H04L 9/3265 713/176 |
| 2015/0074745 | A1* | 3/2015 | Stern ........................ | G06F 21/57 726/1 |
| 2018/0206122 | A1* | 7/2018 | Bradley ................ | H04W 12/02 |

* cited by examiner

*Primary Examiner* — Jung W Kim
*Assistant Examiner* — Alan L Kong
(74) *Attorney, Agent, or Firm* — Weisberg I.P. Law, P.A.

(57) ABSTRACT

A method, system and device are disclosed. A premises device comprising a first operating system and a second operating system is described. The premises device comprises processing circuitry configured to establish a chain of trust at least between the first operating system and at least one software application associated with the second operating system. The processing circuitry is further configured to perform at least one action based at least in part on the established chain of trust.

18 Claims, 5 Drawing Sheets

ESTABLISHING TRUST BETWEEN APPLICATIONS IN A COMPUTING ENVIRONMENT

CROSS-REFERENCE TO RELATED PATENT APPLICATION

This application is related to and claims priority to U.S. Provisional Patent Application Ser. No. 63/232,518, filed Aug. 12, 2021, entitled ESTABLISHING TRUST BETWEEN APPLICATIONS IN A COMPUTING ENVIRONMENT, the entirety of which is incorporated herein by reference.

TECHNICAL FIELD

The present disclosure relates to secured computer systems, and in particular, to establishing trust between applications in a computer environment.

BACKGROUND

Some premises devices for home automation and/or premises security systems use an ARM TrustZone based technology that offers a system-wide approach to security with hardware-enforced isolation built into a Central Processing Unit (CPU) and/or chip. ARM TrustZone technology provides a starting point for establishing a device root of trust based on Platform Security Architecture (PSA) guidelines. In some typical systems, TrustZone technologies can be integrated into several ARM systems.

Certain ARM systems support an Open Portable Trusted Execution Environment (OP-TEE). An OP-TEE system, e.g., an OP-TEE Operating System (OS), operates alongside a traditional Linux OS and uses features of the ARM chip to perform secure operations. For example, software applications running in Linux can use an OP-TEE Application Programming Interface (API) to communicate with the OP-TEE OS to perform cryptographic operations without requiring that the software applications know actual keys (e.g., cryptographic keys) being used for encryption.

The OP-TEE OS allows for encrypted file storage, where accessing the files directly through the Linux file system typically shows encrypted data. In other words, when using OP-TEE storage, the files can be accessed on the filesystem from Linux, but if the files are accessed/read without using an OP-TEE API, then the files may only be accessed as encrypted data (i.e., unusable/unreadable if not decrypted).

However, trusted/secure data may be accessible when using an OP-TEE API. More specifically, any software application running in Linux OS is capable of calling a typical OP-TEE APIs and communicating with trusted code, thereby being capable of accessing trusted data. Accessing trusted/secure data via the OP-TEE API may occur even when software applications running in Linux OS are typically referred as software applications that are inherently not trusted (i.e., unauthenticated). In other words, one drawback of existing OP-TEE systems is that the accessibility to trusted data offered by OP-TEE APIs may be exploited by malicious software applications.

Additionally, an objective of OP-TEE storage is to secure newly created files. When an OP-TEE system is booted for the first time, a new key is created for the purpose of storing files in a secure area of a file system. At least because the new key is created at boot up, it is not trivially possible (e.g., it is difficult) to preload the file system with securely encrypted files, which is another drawback of typical OP-TEE systems.

Hence, the incorporation of typical OP-TEE in premises devices is not without issues.

SUMMARY

Some embodiments advantageously provide methods, systems, and apparatuses for establishing trust between software applications in an OP-TEE enabled environment. In some other embodiments, a chain of trust is established between software applications running in a Linux environment and an OP-TEE OS. In an embodiment, a method to preload a secure storage in OP-TEE with files is described. In another embodiment, once software applications have established trust between themselves and the OP-TEE OS, a trust between two software applications is established to allow direct inter-process communication. In some embodiments, the trust established between the software applications and the OP-TEE is leveraged to then leverage OP-TEE to hold keys for inter-process communication.

In some other embodiments, trust is established between pre-loaded files, e.g., files on OP-TEE, and a software application, e.g., a software application running on Linux. A factory/manufacturer may inject key(s) into the OP-TEE OS, where new binaries are signed with the key(s) as part of a software application authentication process. In other words, the OP-TEE OS, e.g., a trusted OS, may be injected with key(s) where the OP-TEE OS encrypts a received checksum from a Linux Kernel Driver (e.g., checksum associated with binary) using the key(s) in order to generate the last N bytes of the binary. The last N bytes of binary are also transmitted to OP-TEE OS. The encrypted received checksum is compared with received last N bytes of binary to determine whether or not to trust the software application.

In an embodiment, keys are provided by injecting private keys and/or by creating a build holding a public key. In another embodiment, launching software, e.g., a kernel of an OS, may perform a secure boot that can validate bootstrap with at least a key, and "uboot" validation is performed with at least a key. Therefore, a kernel launch can be trusted, e.g., a driver OS and/or signature may be trusted.

In another embodiment, at compile time, a software application may be crypto-signed with a key installed on the software application. A driver, e.g., a Linux Kernel driver, may use OP-TEE to validate that the cryptographic signature is correct, e.g., to establish trust between two applications. Once trust is established between two applications, direct inter-process communication may be performed.

According to one aspect of the present disclosure, a premises device comprising a first operating system and a second operating system is described. The premises device is configured to, and/or comprises processing circuitry configured to, establish a chain of trust at least between the first operating system and at least one software application of a plurality of software applications running on the second operating system.

In some of embodiments, establishing the chain of trust includes storing a secret key in the first operating system, where the secret key is a signing key inaccessible from outside the first operating system, and receiving a request for a driver of the second operating system to perform a software application authentication. The request includes any one of a checksum of a binary that is authenticated excluding a number (N) of bytes of the binary and the number (N) of bytes of the binary, where the number (N) of bytes are the last number (N) of bytes of the binary. Establishing the chain of trust further includes determining that the number (N) of bytes of the binary are identical to a value of a checksum of the binary being authenticated after being encrypted with the signing key.

In some other embodiments, the establishing of the chain of trust further includes the driver of the second operating system any one of calculating the checksum of the binary being authenticated excluding the number (N) of bytes of the binary, including the checksum in the at least one request, including the number (N) of bytes of the binary being authenticated in the at least one request, and when any software application of the plurality of software applications of the second operating system interacts with the first operating system, calculating a checksum of a compiled binary, encrypting a value of the checksum of the compiled binary with the secret key, and appending data to an end of the compiled binary.

In one embodiment, the first operating system includes a secured storage, and one of the premises device and the processing circuitry is further configured to preload the secured storage of the first operating system with at least one file usable by the at least one software application of the plurality of software applications when the at least one software application is authenticated.

In another embodiment, preloading the secured storage of the first operating system includes initiating a pseudo trusted application, where the pseudo trusted application is a storage trusted application and is built directly into the first operating system, and the first operating system includes a data key for encrypting and decrypting data. Preloading the secured storage of the first operating system further includes preloading a file system of the second operating system with encrypted files that are to be loaded into storage, where the encrypted files are encrypted using the data key, and initiating a file application to interact with the storage trusted application. The file application is signed, trusted, and run at boot. In addition, the file application searches for files that have been encrypted and placed into a predetermined area of an unsecured filesystem. The files that have been encrypted are sent to the storage trusted application to be decrypted and placed in storage.

In some embodiments, establishing the chain of trust further includes establishing the chain of trust between a software application and another software application of the plurality of software applications running on the second operating system. Establishing the chain of trust between the software application and the other software application includes initiating a secured communication trusted application to manage session tokens, and when the software application initiates a communication with the other software application, the secured communication trusted application generates a public-private key pair that is referenced by one session token of the session tokens, where the public-private key pair has at least a private key, and the software application requests the one session token of the session tokens from the secured communication trusted application.

In some other embodiments, the communication with the other software application includes a message that is encrypted using the private key, and when the message is received by any one of the software application and the other software application, the message is sent to the secure communication trusted application for decryption.

In one embodiment, the communication with the other software application includes a socket of a socket protocol, where the socket is configured to use Secure Sockets Layer (SSL). The SSL is configured to use at least a key within the secured storage of the first operating system.

In another embodiment, the first operating system is an Open Portable Trusted Execution Environment (OP-TEE), and the second operating system is a Linux operating system.

According to another aspect of the present disclosure, a method implemented in a premises device comprising a first operating system and a second operating system is described. The method includes establishing a chain of trust at least between the first operating system and at least one software application of a plurality of software applications running on the second operating system.

In some embodiments, establishing the chain of trust includes storing a secret key in the first operating system, where the secret key is a signing key inaccessible from outside the first operating system, and receiving a request for a driver of the second operating system to perform a software application authentication. The request includes any one of a checksum of a binary that is authenticated excluding a number (N) of bytes of the binary and the number (N) of bytes of the binary, where the number (N) of bytes are the last number (N) of bytes of the binary. Establishing the chain of trust further includes determining that the number (N) of bytes of the binary are identical to a value of a checksum of the binary being authenticated after being encrypted with the signing key.

In some other embodiments, the establishing of the chain of trust further includes the driver of the second operating system any one of calculating the checksum of the binary being authenticated excluding the number (N) of bytes of the binary, including the checksum in the at least one request, including the number (N) of bytes of the binary being authenticated in the at least one request, and when any software application of the plurality of software applications of the second operating system interacts with the first operating system, calculating a checksum of a compiled binary, encrypting a value of the checksum of the compiled binary with the secret key, and appending data to an end of the compiled binary.

In one embodiment, the first operating system includes a secured storage, and one of the premises device and the processing circuitry is further configured to preload the secured storage of the first operating system with at least one file usable by the at least one software application of the plurality of software applications when the at least one software application is authenticated.

In another embodiment, preloading the secured storage of the first operating system includes initiating a pseudo trusted application, where the pseudo trusted application is a storage trusted application and is built directly into the first operating system, and the first operating system includes a data key for encrypting and decrypting data. Preloading the secured storage of the first operating system further includes preloading a file system of the second operating system with encrypted files that are to be loaded into storage, where the encrypted files are encrypted using the data key, and initiating a file application to interact with the storage trusted application. The file application is signed, trusted, and run at boot. In addition, the file application searches for files that have been encrypted and placed into a predetermined area of an unsecured filesystem. The files that have been encrypted are sent to the storage trusted application to be decrypted and placed in storage.

In some embodiments, establishing the chain of trust further includes establishing the chain of trust between a software application and another software application of the plurality of software applications running on the second operating system. Establishing the chain of trust between the software application and the other software application includes initiating a secured communication trusted application to manage session tokens, and when the software application initiates a communication with the other software application, the secured communication trusted application generates a public-private key pair that is referenced by one session token of the session tokens, where the public-private key pair has at least a private key, and the software application requests the one session token of the session tokens from the secured communication trusted application.

In some other embodiments, the communication with the other software application includes a message that is encrypted using the private key, and when the message is received by any one of the software application and the other software application, the message is sent to the secure communication trusted application for decryption.

In one embodiment, the communication with the other software application includes a socket of a socket protocol, where the socket is configured to use Secure Sockets Layer (SSL). The SSL is configured to use at least a key within the secured storage of the first operating system.

In another embodiment, the first operating system is an Open Portable Trusted Execution Environment (OP-TEE), and the second operating system is a Linux operating system.

According to one aspect, a premises device comprising a first operating system and a second operating system is described. The premises device includes processing circuitry configured to establish a chain of trust at least between the first operating system and at least one software application associated with the second operating system; and perform at least one action based at least in part on the established chain of trust.

In some embodiments, the establishing of the chain of trust includes at least one of: storing a secret key in the first operating system, where the secret key is a signing key inaccessible from outside the first operating system; and receiving a request for a driver of the second operating system to perform a software application authentication. The request includes any one of: a checksum of a binary being authenticated excluding a number (N) of bytes of the binary; and the number (N) of bytes of the binary, the number (N) of bytes being the last number (N) of bytes of the binary. The establishing of the chain of trust may further include at least one of: determining that the number (N) of bytes of the binary are identical to a value of a checksum of the binary being authenticated after being encrypted with the signing key, where the determination is performed at least in part to establish the chain of trust; and authenticating the at least one software application based at least on the determination.

In some other embodiments, the establishing of the chain of trust further includes the driver of the second operating system being configured to at least one of: calculate the checksum of the binary being authenticated excluding the number (N) of bytes of the binary; include the checksum in the request; include the number (N) of bytes of the binary being authenticated in the request; and when the at least one software application associated with the second operating system interacts with the first operating system: calculate a checksum of a compiled binary; encrypt a value of the checksum of the compiled binary with the secret key; and append data to an end of the compiled binary.

In one embodiment, the first operating system includes a secured storage, and the processing circuitry is further configured to preload the secured storage of the first operating system with at least one file usable by the at least one software application associated with the second operating system when the at least one software application is authenticated.

In another embodiment, the preloading of the secured storage of the first operating system includes at least one of: initiating a pseudo trusted application, where the pseudo trusted application is a storage trusteed application and built directly into the first operating system, and the first operating system includes a data key for encrypting and decrypting data; preloading a file system of the second operating system with encrypted files that are to be loaded into storage, where the encrypted files is encrypted using the data key; and initiating a file application to interact with the storage trusted application, where the file application is signed, trusted, and run at boot. The file application searches for files that have been encrypted and placed into a predetermined area of an unsecured filesystem and sends the files that have been encrypted to the storage trusted application to be decrypted and placed in storage.

In some embodiments, the establishing of the chain of trust further includes establishing the chain of trust between a software application and another software application of the at least one software application associated with the second operating system. The establishing the chain of trust between the software application and the other software application includes: initiating a secured communication trusted application to manage session tokens; when the software application initiates a communication with the other software application: generating, by the secured communication trusted application, a public-private key pair that is referenced by one session token of the session tokens, where the public-private key pair has at least a private key; and requesting, by the software application, the one session token of the session tokens from the secured communication trusted application.

In some other embodiments, the communication with the other software application includes a message that is encrypted using the private key. When the message is received by any one of the software application and the other software application, the message is sent to the secure communication trusted application for decryption.

In an embodiment, the communication with the other software application includes a socket of a socket protocol, the socket being configured to use Secure Sockets Layer, SSL. The SSL is configured to use at least a key within a secured storage of the first operating system.

In another embodiment, the first operating system is an Open Portable Trusted Execution Environment, OP-TEE, and the second operating system is a Linux operating system.

According to another aspect, a method implemented in a premises device comprising a first operating system and a second operating system is described. The method includes establishing a chain of trust at least between the first operating system and at least one software application associated with the second operating system; and performing at least one action based at least in part on the established chain of trust.

In some embodiments, the establishing of the chain of trust includes at least one of: storing a secret key in the first operating system, where the secret key is a signing key inaccessible from outside the first operating system; and receiving a request for a driver of the second operating system to perform a software application authentication. The request includes any one of: a checksum of a binary being authenticated excluding a number (N) of bytes of the binary; and the number (N) of bytes of the binary, the number (N) of bytes being the last number (N) of bytes of the binary. The establishing of the chain of trust may further include at least one of: determining that the number (N) of bytes of the binary are identical to a value of a checksum of the binary being authenticated after being encrypted with the signing key, where the determination is performed at least in part to establish the chain of trust; and authenticating the at least one software application based at least on the determination.

In some other embodiments, the establishing of the chain of trust further includes the driver of the second operating system being configured to at least one of: calculate the checksum of the binary being authenticated excluding the number (N) of bytes of the binary; include the checksum in the request; include the number (N) of bytes of the binary being authenticated in the request; and when the at least one software application associated with the second operating system interacts with the first operating system: calculate a checksum of a compiled binary; encrypt a value of the checksum of the compiled binary with the secret key; and append data to an end of the compiled binary.

In one embodiment, the first operating system includes a secured storage, and the method further includes preloading the secured storage of the first operating system with at least one file usable by the at least one software application associated with the second operating system when the at least one software application is authenticated.

In another embodiment, the preloading of the secured storage of the first operating system includes at least one of: initiating a pseudo trusted application, where the pseudo trusted application is a storage trusteed application and built directly into the first operating system, and the first operating system includes a data key for encrypting and decrypting data; preloading a file system of the second operating system with encrypted files that are to be loaded into storage, where the encrypted files is encrypted using the data key; and initiating a file application to interact with the storage trusted application, where the file application is signed, trusted, and run at boot. The file application searches for files that have been encrypted and placed into a predetermined area of an unsecured filesystem and sends the files that have been encrypted to the storage trusted application to be decrypted and placed in storage.

In some embodiments, the establishing of the chain of trust further includes establishing the chain of trust between a software application and another software application of the at least one software application associated with the second operating system. The establishing the chain of trust between the software application and the other software application includes: initiating a secured communication trusted application to manage session tokens; when the software application initiates a communication with the other software application: generating, by the secured communication trusted application, a public-private key pair that is referenced by one session token of the session tokens, where the public-private key pair has at least a private key; and requesting, by the software application, the one session token of the session tokens from the secured communication trusted application.

In some other embodiments, the communication with the other software application includes a message that is encrypted using the private key. When the message is received by any one of the software application and the other software application, the message is sent to the secure communication trusted application for decryption.

In an embodiment, the communication with the other software application includes a socket of a socket protocol, the socket being configured to use Secure Sockets Layer, SSL. The SSL is configured to use at least a key within a secured storage of the first operating system.

In another embodiment, the first operating system is an Open Portable Trusted Execution Environment, OP-TEE, and the second operating system is a Linux operating system.

According to one aspect, a premises device comprising a first operating system and a second operating system. The premises device comprises processing circuitry configured to: store a secret key in the first operating system, where the secret key is a signing key inaccessible from outside the first operating system; and receive a request for a driver of the second operating system to authenticate at least one application associated with the second operating system. The request includes at least one of: a checksum of a binary being authenticated excluding a number (N) of bytes of the binary; and the number (N) of bytes of the binary, the number (N) of bytes being the last number (N) of bytes of the binary. The processing circuitry is further configured to determine that the number (N) of bytes of the binary are identical to a value of a checksum of the binary being authenticated after being encrypted with the signing key; establish a chain of trust at least between the first operating system and the at least one software application associated with the second operating system based at least in part on the received request and the determination; and perform at least one action based at least in part on the established chain of trust.

According to one embodiment this aspect, the establishing the chain of trust includes authenticating the at least one software application. The processing circuitry is further configured to: preload the secured storage of the first operating system with at least one file usable by the authenticated at least one software application, and cause the authenticated at least one software application to use the at least one file to perform at least one action based at least in part on the established chain of trust.

According to another aspect, a premises device comprising a first operating system and a second operating system is described. The first operating system includes a secured storage. The premises device includes processing circuitry configured to: store a secret key in the first operating system, where the secret key is a signing key inaccessible from outside the first operating system; and receive a request for a driver of the second operating system to authenticate at least one application associated with the second operating system. The request includes at least one of: a checksum of a binary being authenticated excluding a number (N) of bytes of the binary; and the number (N) of bytes of the binary, the number (N) of bytes being the last number (N) of bytes of the binary. The processing circuitry is further configured to determine that the number (N) of bytes of the binary are identical to a value of a checksum of the binary being authenticated after being encrypted with the signing key; establish a chain of trust at least between the first operating system and the at least one software application associated with the second operating system based at least in part on the received request and the determination, where the establishing the chain of trust includes authenticating the at least one software application; preload the secured storage of the first operating system with at least one file usable by the authenticated at least one software application; and cause the authenticated at least one software application to use the at least one file to perform at least one action based at least in part on the established chain of trust.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
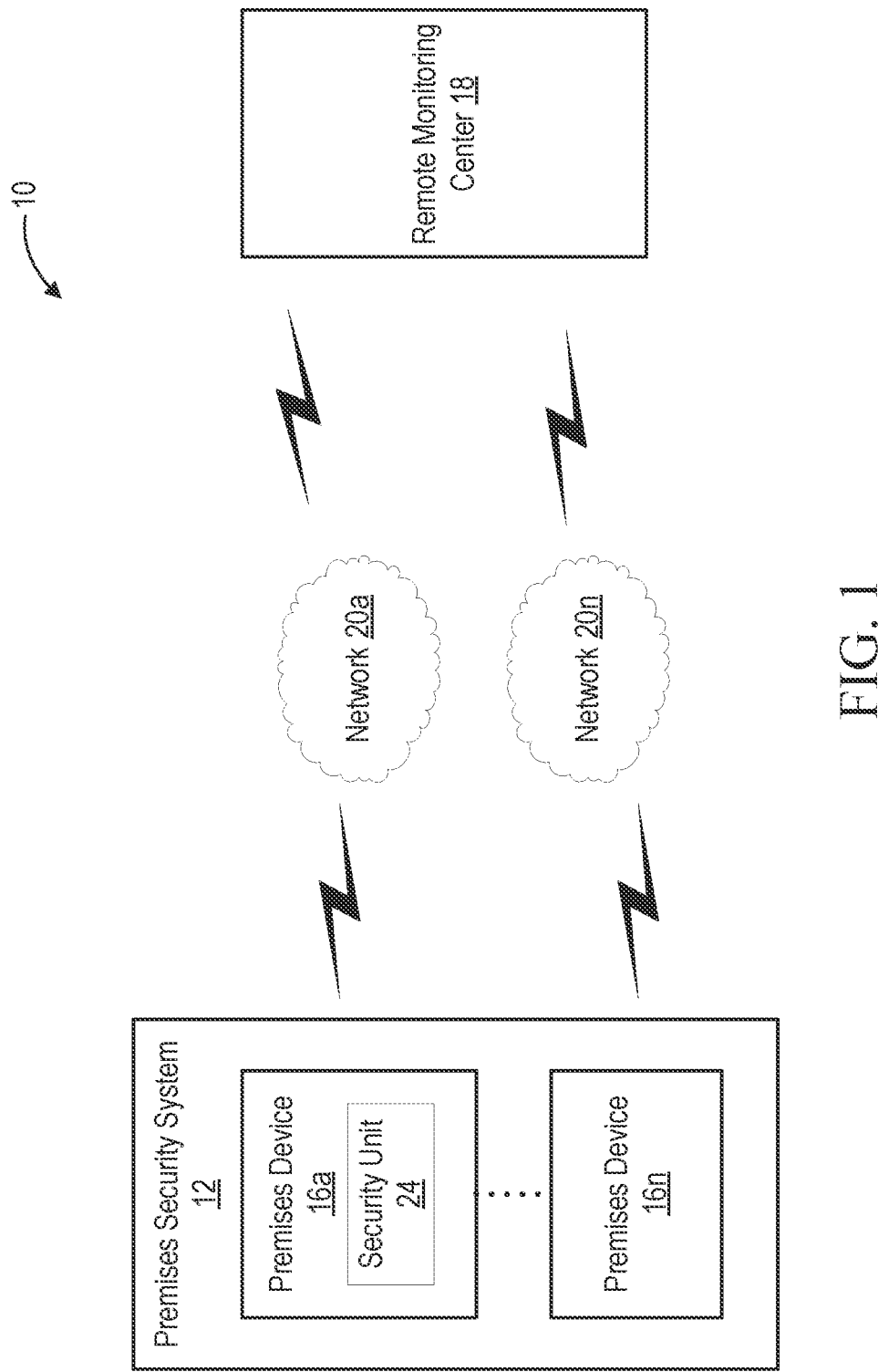
FIG. 1 is a diagram of an example system comprising a premises security system, which includes at least a premises device, according to some embodiments of the present disclosure.

Before describing in detail exemplary embodiments, it is noted that the embodiments reside primarily in combinations of apparatus components and processing steps related to establishing trust between software applications in an OP-TEE enabled environment. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, secure boot refers to an industry concept that establishes (i.e., used to establish) a chain of trust between hardware and software, e.g., software being loaded at boot time. A chain of trust may refer to a trust/trust relationship (e.g., a trust structure, a trust connection, a trust link, a trusted access, a certificate/key usable between one or more elements, an encrypted link, etc.) that may be established between one or more elements of a system such as software and hardware. In one nonlimiting example, a chain of trust may comprise a first trust relationship (e.g., established between a first element of the system and a second element of the system) and a second trust relationship (e.g., established between the second element of the system and a third element of the system). The first and second elements may be software (e.g., a software application in an operating system, an operating system, driver, kernel, etc.) and/or hardware (e.g., a file system, memory of an operating system, hardware of the operating system). In other words, the first trust relationship and the second trust relationship may be referred to as trust links that link elements of the system to form the chain of trust. In some embodiments, the chain of trust may be established between a first element of a system such as a first operating system and a second element such as at least one software application associated with a second operating system. Each one of the first and second elements may include one or more elements that may be linkable by one or more trust links, e.g., a sequence of trust links that forms a chain of trust.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of a system 10 according to an embodiment of the present invention. System 10 includes a premises security system 12, which comprises a premises devices 16a and 16n (collectively referred to as premises device 16). Although premises security system 12 is shown as comprising security/premises devices 16a and 16n, premises security system 12 is not limited to comprising only premises devices 16a and 16n and may include additional premises devices 16. Any premises device 16 can be in simultaneous communication and/or configured to separately communicate with more than one other premises device 16 and/or other premises security system 12 and/or other system 10. Although premises device 16 is included in the premises security system 12, premises device 16 is not limited to being included in the premises security system 12 and/or system 10 and may reside standing alone, as part of another system, or in any other manner.

Further, each premises device 16 may include sensors, control panels, control devices, images capture devices, life safety devices, life style devices and/or other devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include digital cameras and/or video cameras, among other image capture devices that are well known in the art.

System 10 may also include a remote monitoring center 18, which may be capable of performing certain monitoring, configuration and/or control functions associated with premises security system 12. For example, with respect to fire and carbon monoxide detectors/sensors, monitoring data may include at least one carbon monoxide readings, smoke detection reading, sensor location and time of reading, among other related to these detectors that may be communicated with remote monitoring center 18. In yet another example, with respect to a door contact detector, monitoring data may include at least one of sensor location and time of detection, among other data related to the door contact detection that may be communicated with remote monitoring center 18.

Alarm event data from the premises devices 16 may be used by the remote monitoring center 18 in running through various safety response processes in notifying the owner of the premises, determining whether an actual alarm event is occurring at the premises, and notifying any appropriate response agency (e.g., police, fire, emergency response, other interested parties such as premises owners, etc.).

Further, system 10 may include network 20a-20n (collectively referred to as network 20), which may be configured to provide communication, e.g., wired and/or wireless communication, between components of system 10, e.g., between premises security system 12 and remote monitoring center 18. For example, premises device 16 of premises security system 12 may communicate with the remote monitoring center 18 via network 20, e.g., to provide alarm event data associated with premises security system 12.

Premises device 16 is configured to include a security unit 24 which is configured at least to establish a chain of trust between software applications and at least an operating system, and/or preload a storage, i.e., a memory, with files.

Example implementations, in accordance with an embodiment, of the premises device 16 discussed in the preceding paragraphs will now be described with reference to FIG. 2.

The premises security system 12 includes a premises device 16 including hardware 28. The hardware 28 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 40 may be configured as a storage device and may have one or more partitions such as a secure partition/portion and another partition/portion such as an accessible portion. Further, the portions/partitions of memory 40 may be configured a predetermined level of security (accessibility). For example, a first partition of memory 40 may be configured to be fully secured (i.e., accessible only when a predetermined condition of accessibility is met such as by an operating system), a second partition of memory 40 may be accessible (e.g., accessible when no (or some) conditions of accessibility are met such as by an operating system), and a third partition of memory 40 may be configured to be a hybrid of the first and second partitions. The conditions of accessibility may include authentication parameters and/or any other access control conditions In some embodiments, a first partition of memory 40 may be configured to store and/or execute a first operating system, and a second partition of memory 40 may be configured to store and/or execute a second operating system. In some other embodiments, memory 40 may comprise a plurality of memories, e.g., memory 40a, 40b, 40c, where each memory may be separated logically and/or physically and/or functionally.

Thus, the premises device 16 further has software 42 stored internally in, for example, memory 40, or stored in external memory (e.g., database, storage array, network storage device, etc.) accessible by the premises device premises device 16 via an external connection. The software 42 may be executable by the processing circuitry 36. Further, software 42 includes at least a first operating system 44a, such as an OP-TEE, an OP-TEE OS, an OP-TEE system or any other kind of operating system, and a second operating system 44b, such as Linux, Unix, Android, Microsoft Windows, a virtual operating system, or any other kind of operating system. The first and second operating systems 44a and 44b may collectively be referred to as operating system 44. Operating system 44, e.g., any one of the first and second operating systems 44a and 44b, may be configured to manage resources such as processing circuitry 36, memory 40, processor 38, security unit 24, and/or any one of software applications 46a and 46b (collectively referred to as software application 46). Operating system 44 may also include drivers and/or file systems and/or application programming interfaces (API) to interact and/or communicate with other components that may be internal and/or external to the operating system 44 and/or premises device premises device 16. The first operating system 44a and the second operating system 44b may interact/communicate (e.g., share resources, software applications, etc.) with each other. In a nonlimiting example, any one of the software application 46a and/or components of the first operating 44a may interact/communicate with any of the software application 46b and/or components of the second operating system 44b. Similarly, any one of the software application 46b and/or components of the first operating 44b may interact/communicate with any of the software application 46a and/or components of the second operating system 44b.

Although the first and second operating systems 44a, 44b have been described, software 42 may include more than the first and a second operating systems 44a, 44b. In addition, each one of software applications 46a and 46b may include more than one software application. In a nonlimiting example, software application 46a may include software applications 46aa and 46ab (shown in FIG. 3). Similarly, software application 46b may include software applications 46ba and 46bb (shown in FIG. 3).

Further, software application 46 may include Trusted Applications (TAs), which can be implemented as Pseudo TAs and/or user mode TAs. User mode TAs are full featured Trusted Applications as specified by GlobalPlatform API TEE specifications, generally referred to a "Trusted Applications." A Pseudo TA may be an interface, e.g., exposed by an OP-TEE Core, to secure client Trusted Applications and to non-secure client entities. Software application 46 may also include a file application, storage application, e.g., storage trusted application, communication application, e.g., a secured communication trusted application, OP-TEE applications, Linux OS applications, and/or any other type of application. In addition, software application 46 may be configured to communicate and/or establish a trust, e.g., a chain of trust, with any other software application 46 and/or any other component of premises device 16 and/or premises security system 12 and/or any other system or component. Further, software application 46 may be configured to run (i.e., execute) and/or be included directly as part of software 42 and/or premises device 16. Software application 46 may be virtualized and/or running outside premises device 16 and/or any of the components of premises device 16.

The processing circuitry 36 may be configured to control any of methods and/or processes described herein and/or to cause such methods, and/or processes to be performed, e.g., by premises device 16. Processor 38 corresponds to one or more processors 38 for performing premises device 16 functions described herein. The memory 40 is configured to store data and/or files and/or encryption elements, e.g., security keys, and/or programmatic software code and/or other information described herein. In some embodiments, the software 42 may include instructions that, when executed by the processor 38 and/or processing circuitry 36, causes the processor 38 and/or processing circuitry 36 to perform the processes described herein with respect to premises device 16. For example, processing circuitry 36 of the premises device 16 may include security unit 24 which is configured to at least to establish a chain of trust between software applications and at least an operating system, and/or preload a storage, i.e., a memory, with files.

Figure 2:
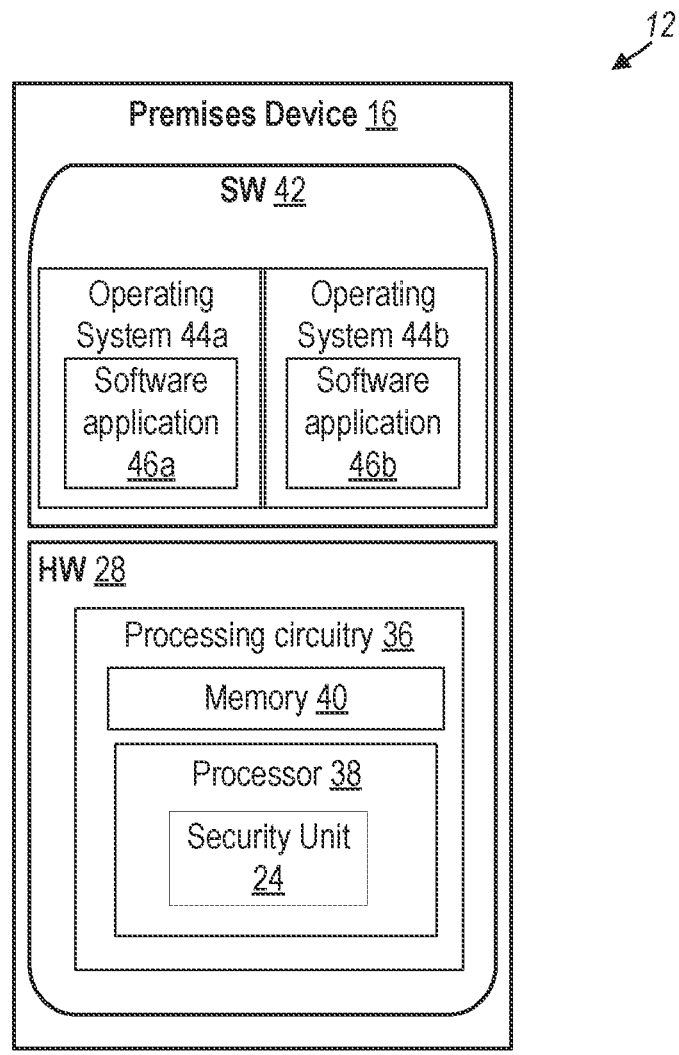
FIG. 2 is a block diagram of a premises device of a premises security system according to some embodiments of the present disclosure.

Although FIGS. 1 and 2 show various "units" such as security units 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
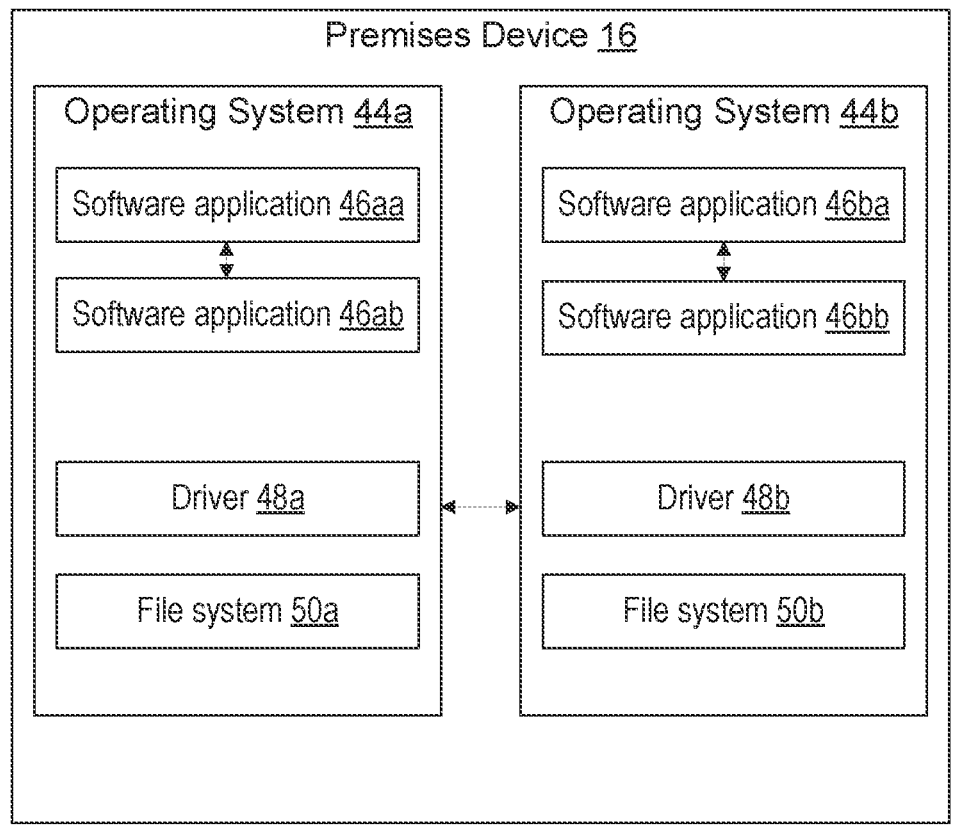
FIG. 3 is an example premises device including at least one operating system according to some embodiments of the present disclosure.

FIG. 3 is an example premises device including at least two operating systems. More specifically, premises device 16 includes a first operating system 44a and a second operating system 44b. The first operating system 44a may include software application 46aa and/or software application 46ab. In addition, the first operating system 44a may include a driver 48a and/or a file system 50a. Similarly, the second operating system 44b may include software application 46ba and/or software application 46bb. In addition, operating system 44b may include a driver 48b and/or a file system 50a. Driver 48 (e.g., driver 48a, 48b, etc.) may be configured to establish and/or maintain and/or terminate communication between a corresponding operating system 44 (and/or premises device 16) and another device and/or system, e.g., another operating system 44 and/or another premises device 16 and/or another device and/or other drivers 48. Further, Driver 48 may be configured to establish and/or maintain and/or terminate communication where the operating system 44 and the other operating system 44 and/or other devices communicate using the same or different communication protocols and signaling. In some embodiments, driver 48 may be configured to use (e.g., include) an application programming interface (API) configurable to communicate with other devices. In a nonlimiting example, driver 48a may be configured to provide communication between operating system 44a and operating system 44b (e.g., where each operating system 44 may be a different operating system which may have different functions and/or characteristics and/or use different communication protocols/functions. Likewise, driver 48b may be configured to provide communication between operating system 44b and operating system 44a. Each one of files systems 50a and 50b may be configured to manage files associated at least with their respective operating systems 44a and 44b and/or access files associated with the operating system and/or files from another operating system and/or other devices.

In a nonlimiting example, the first operating system 44a may be an OP-TEE OS, and the second operating system 44b may be a Linux OS, including driver 48b, which may be an OP-TEE Linux Kernel Driver. Driver 48b, e.g., the OP-TEE Linux Kernel Driver, may provide at least a path to communicate with the first operating system 44a, e.g., the OP-TEE OS. For example, driver 48b, e.g., the OP-TEE Linux Kernel Driver, may use a secure APIs to access the OP-TEE OS, thereby allowing communication from trusted applications using the OP-TEE APIs. In one or more embodiments, the OPTEE-OS is loaded into a secure portion of RAM (defined by, for example, the ARM TrustZone technology, loaded in a secure portion of memory 40, etc.), and the Linux Kernel (e.g., stored in memory 40 and/or executable by operating system 44a, 44b) is loaded in an unsecured portion of the RAM (e.g., an unsecure/accessible portion of memory 40 such as corresponding to operating system 44b). The OP-TEE Linux Kernel Driver uses secure APIs to access the OP-TEE OS, which allows communication from trusted applications using the OP-TEE APIs.

Premises device 16 may be configured to establish a chain of trust between software application 46ba of the second operating system 44b, e.g., the Linux OS, and the first operating system 44a. In addition, a chain of trust may be further established between software application 46ba and 46bb of the second operating system 44b. Further, premises device 16 may preload the first operating system 44a, e.g., preloading a secured storage with files usable by software application 46ba and/or software application 46bb after being authenticated. The preloading of the first operating system 44a may include preloading files system 50b, e.g., the Linux file system, with at least a file. Although the first operating system 44a has been described as an OP-TEE OS, the second operating system 44b as a Linux OS, and driver 48b as an OP-TEE Linux Kernel Driver, any one of the first and second operating system 44a and 44b or any of their components are not limited to the example described above.

Figure 4:
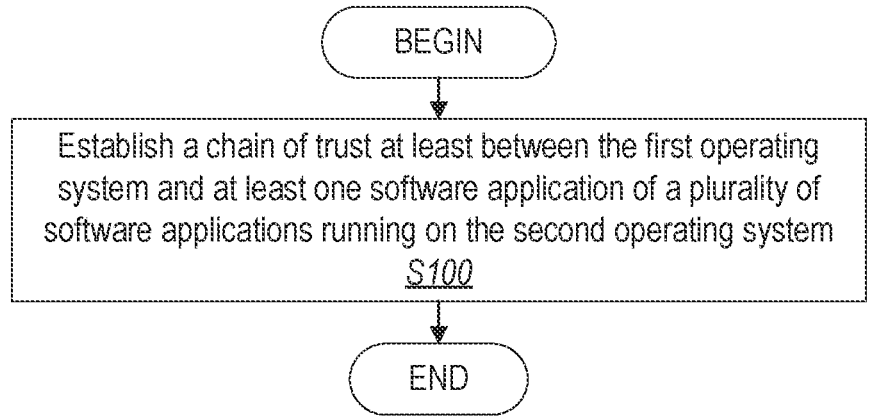
FIG. 4 is a flowchart of an example process in a premises device for establishing a chain of trust between software applications and an operating system according to some embodiments of the present disclosure.

FIG. 4 is a flowchart of an example process in a premises device 16 for establishing a chain of trust. One or more blocks described herein may be performed by one or more elements of premises device 16 such as by one or more of processing circuitry 36 (including the security unit 24) and/or processor 38. Premises device 16 such as via processing circuitry 36 and/or processor 38 is configured to establish (Block S100) a chain of trust at least between the first operating system 44a and at least one software application of a plurality of software applications 46 running on the second operating system 44b.

In some embodiments, establishing the chain of trust includes storing a secret key in the first operating system 44a (in a corresponding portion of memory 40), where the secret key is a signing key inaccessible from outside the first operating system 44a, and receiving a request for a driver 48 of the second operating system 44b to perform a software application authentication. The request includes any one of a checksum of a binary being authenticated excluding a number (N) of bytes of the binary and the number (N) of bytes of the binary. The number (N) of bytes may be the last number (N) of bytes of the binary. Further, the number (N) of bytes of the binary is determined to be identical to a value of a checksum of the binary being authenticated after being encrypted with the signing key.

In some other embodiments, establishing the chain of trust further includes the driver of the second operating system 44b any one of calculating the checksum of the binary being authenticated excluding the number (N) of bytes of the binary, including the checksum in the at least one request, and including the number (N) of bytes of the binary being authenticated in the at least one request. In addition, when any software application of the plurality of software applications 46 of the second operating system 44b interacts with the first operating system 44a, a checksum of a compiled binary is calculated, a value of the checksum of the compiled binary is encrypted with the secret key, and data appended to an end of the compiled binary.

In some embodiments, the first operating system 44a includes a secured storage (e.g., a secure portion of memory 40), and one of the premises device 16 and the processing circuitry 36 is further configured to preload the secured storage of the first operating system 44a with at least one file usable by the at least one software application of the plurality of software applications when the at least one software application is authenticated.

In an embodiment, preloading the secured storage of the first operating system 44a includes initiating a pseudo trusted application, where the pseudo trusted application is a storage trusted application and built directly into the first operating system 44a. The first operating system includes a data key for encrypting and decrypting data. Preloading the secured storage of the first operating system 44a further includes preloading a file system 50b of the second operating system 44b with encrypted files that are to be loaded into storage, where the encrypted files are encrypted using the data key, and initiating a file application to interact with the storage trusted application. The file application is signed, trusted, and run at boot. In addition, the file application searches for files that have been encrypted and placed into a predetermined area of an unsecured filesystem and sends the files that have been encrypted to the storage trusted application to be decrypted and placed in storage.

In another embodiment, establishing the chain of trust further includes establishing the chain of trust between a software application 46a (e.g., at least one of software applications 46aa, 46ab) and another software application 46b of the plurality of software applications (e.g., at least one of software applications 46ba, 46bb) running on the second operating system 44b. Establishing the chain of trust between the software application 46a and the other software application 46b further includes initiating a secured communication trusted application to manage session tokens, and when the software application 46a initiates a communication with the other software application 46b, the secured communication trusted application generates a public-private key pair referenced by one session token of the session tokens. The public-private key pair has at least a private key. In addition, the software application 46a requests the one session token of the session tokens from the secured communication trusted application.

In some embodiments, the communication with the other software application 46b includes a message that is encrypted using the private key, and when the message is received by any one of the software application 46a and the other software application 46b, the message is sent to the secure communication trusted application for decryption.

In some other embodiments, the communication with the other software application 46b includes a socket of a socket protocol. The socket is configured to use Secure Sockets Layer (SSL), and the SSL is configured to use at least a key within the secured storage of the first operating system 44a.

In some other embodiments, the first operating system 44a is an Open Portable Trusted Execution Environment (OP-TEE), and the second operating system 44b is a Linux operating system.

Figure 5:
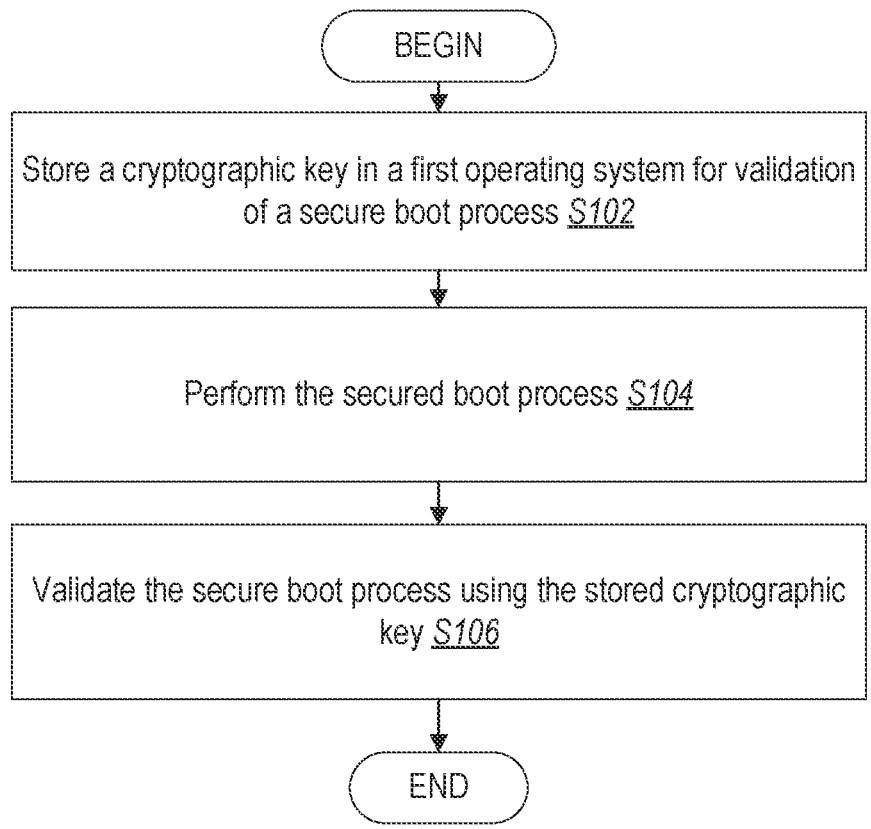
FIG. 5 is a flowchart of an example process in a premises device for preloading a secured storage of an operating system according to some embodiments of the present disclosure.

FIG. 5 is a flowchart of an example process in a premises device 16 for preloading a secured storage of an operating system 44. One or more blocks described herein may be performed by one or more elements of premises device 16 such as by one or more of processing circuitry 36 (including the security unit 24) and/or processor 38. Premises device 16 such as via processing circuitry 36 and/or processor 38 is configured to store (Block S102) a cryptographic key in a first operating system 44a for validation of a secure boot process. The secure boot process is performed (Block S104), and the secure boot process is validated (Block S106) using the stored cryptographic key. For example, in one or more embodiments, the cryptographic key is stored before the secure boot process is initiated.

In one or more embodiments, secure boot establishes a method that loads a plurality of bootloaders (e.g., all of the bootloaders) up until the boot into Linux (e.g., the second operating system 44b) is trusted. Secure boot may require that a key is burned into the ARM processor/memory itself (though the concept is not unique to ARM). In the ARM chips (e.g., processing circuitry 36), once the key is written a fuse is burned within the chip that prevents writing the key again, and it is written in a place that only the processor itself can access. When booting, it verifies that the first stage bootloader is encrypted with that key, which means that the first stage bootloader can be trusted. The first stage bootloader then reads the second stage bootloader (U-Boot, for example) from flash memory and verifies that it is also encrypted using a special key.

The Linux kernel may be packaged as a FIT (flattened image tree) image with OP-TEE OS and encrypted. The kernel itself can have drivers built into it, so they cannot be changed during runtime. Given all this, the kernel can be trusted since it is encrypted using a secret key, which is only decrypted by the second stage bootloader, which is only decrypted by our first stage bootloader, which is only decrypted by our key-injected processors. Secure boot may also be referred to as "trusted boot" or "verified boot".

Figure 6:
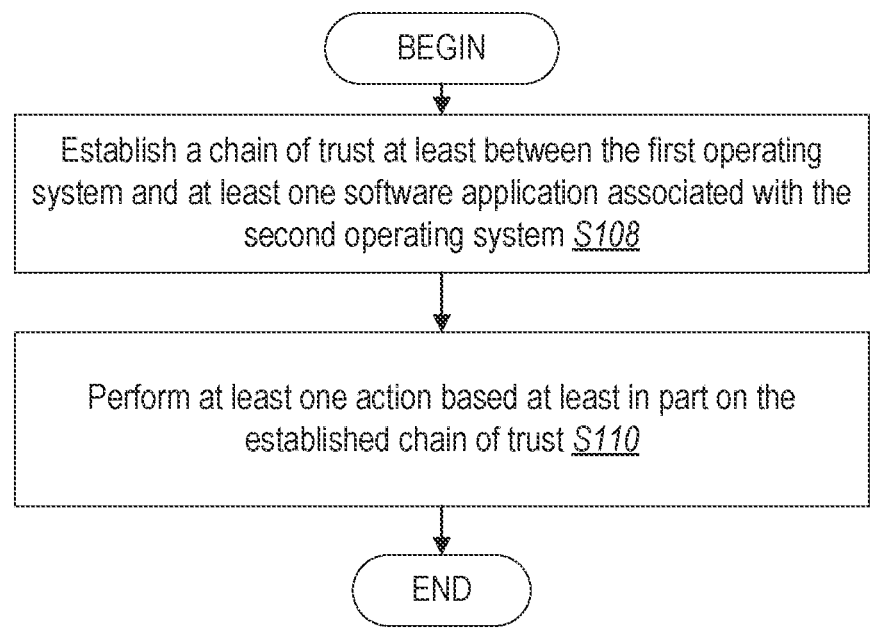
FIG. 6 is a flowchart of another example process in a premises device for establishing a chain of trust according to some embodiments of the present disclosure.

FIG. 6 is a flowchart of another example process in a premises device 16 for establishing a chain of trust. One or more blocks described herein may be performed by one or more elements of premises device 16 such as by one or more of processing circuitry 36 (including the security unit 24) and/or processor 38. Premises device 16 such as via processing circuitry 36 and/or processor 38 is configured to establish (Block S108) a chain of trust at least between the first operating system 44a and at least one software application 46b associated with the second operating 44b and perform (Block S110) at least one action based at least in part on the established chain of trust.

In some embodiments, the establishing of the chain of trust includes at least one of: storing a secret key in the first operating system 44a, where the secret key is a signing key inaccessible from outside the first operating system 44a; and receiving a request for a driver of the second operating system 44b to perform a software application authentication. The request includes any one of: a checksum of a binary being authenticated excluding a number, N, of bytes of the binary; and the number, N, of bytes of the binary, the number, N, of bytes being the last number, N, of bytes of the binary. The establishing of the chain of trust may further include at least one of: determining that the number, N, of bytes of the binary are identical to a value of a checksum of the binary being authenticated after being encrypted with the signing key, where the determination is performed at least in part to establish the chain of trust; and authenticating the at least one software application based at least on the determination.

In some other embodiments, the establishing of the chain of trust further includes the driver 48b of the second operating system 44b being configured to at least one of: calculate the checksum of the binary being authenticated excluding the number, N, of bytes of the binary; include the checksum in the request; include the number, N, of bytes of the binary being authenticated in the request; and when the at least one software application 46b associated with the second operating system 44b interacts with the first operating system 44a: calculate a checksum of a compiled binary; encrypt a value of the checksum of the compiled binary with the secret key; and append data to an end of the compiled binary.

In one embodiment, the first operating system 44a includes a secured storage, and the method further includes preloading the secured storage of the first operating system 44a with at least one file usable by the at least one software application 46b associated with the second operating system 44b when the at least one software application 46b is authenticated.

In another embodiment, the preloading of the secured storage of the first operating system 44a includes at least one of: initiating a pseudo trusted application, where the pseudo trusted application is a storage trusteed application and built directly into the first operating system 44a, and the first operating system 44a includes a data key for encrypting and decrypting data; preloading a file system 50b of the second operating system 44b with encrypted files that are to be loaded into storage, where the encrypted files is encrypted using the data key; and initiating a file application to interact with the storage trusted application, where the file application is signed, trusted, and run at boot. The file application searches for files that have been encrypted and placed into a predetermined area of an unsecured file system and sends the files that have been encrypted to the storage trusted application to be decrypted and placed in storage.

In some embodiments, the establishing of the chain of trust further includes establishing the chain of trust between a software application 46ba (or 46a) and another software application 46bb (or 46b) of the at least one software application associated with the second operating system.

The establishing the chain of trust between the software application and the other software application includes: initiating a secured communication trusted application to manage session tokens; when the software application initiates a communication with the other software application: generating, by the secured communication trusted application, a public-private key pair that is referenced by one session token of the session tokens, where the public-private key pair has at least a private key; and requesting, by the software application, the one session token of the session tokens from the secured communication trusted application.

In some other embodiments, the communication with the other software application includes a message that is encrypted using the private key. When the message is received by any one of the software application and the other software application, the message is sent to the secure communication trusted application for decryption.

In an embodiment, the communication with the other software application includes a socket of a socket protocol, the socket being configured to use Secure Sockets Layer, SSL. The SSL is configured to use at least a key within a secured storage of the first operating system.

In another embodiment, the first operating system 44a is an Open Portable Trusted Execution Environment, OP-TEE, and the second operating system 44b is a Linux operating system.

Having described the general process flow of arrangements of the disclosure and having provided examples of hardware and software arrangements for implementing the processes and functions of the disclosure, the sections below provide details and examples of arrangements for performing OP-TEE based functions such as establishing trust between software applications in an OP-TEE enabled environment.

In one or more embodiments, a chain of trust between hardware and software is established (e.g., using a secure boot). Establishing the chain of trust may include leveraging keys burned into (i.e., stored in) one-time flash (e.g., memory 40) in an ARM processor (e.g., processor 38) to decrypt a first stage bootloader (e.g., an AT91bootstrap), which then uses a different key to decrypt a second stage bootloader (e.g., U-Boot). In another embodiment, when the second stage bootloader (e.g., U-Boot) loads, it decrypts a flattened image tree that includes an OP-TEE OS (i.e., first operating system 44a) and a Linux Kernel (i.e., second operating system 44b). In other words, a chain of trust is established, e.g., from boot time to running (i.e., executing, loading, etc.) the OP-TEE OS and Linux Kernel (i.e., Linux OS).

Some embodiments provide for establishing trust between an OP-TEE OS (i.e., first operating system 44a) and a software application that communicates with the OP-TEE OS. To establish the trust, the OP-TEE OS is modified to contain a secret key into the OP-TEE OS directly. The secret key is inherently not accessible externally, e.g., from a Linux environment (second operating system 44b). The secret key may be a "SIGNING KEY." In addition, the OP-TEE may be modified to check that requests for a driver, e.g., an OP-TEE Linux Kernel Driver, to authenticate a software application include a checksum of a binary being authenticated, not including the last N bytes of that binary. Requests for the driver, e.g., the OP-TEE Linux Kernel Driver, to authenticate a software application may be configured to contain the last N bytes of that binary. Further, the OP-TEE may be modified to check that the last N bytes of the binary being authenticated is identical to the value of the checksum after being encrypted with the "SIGNING KEY."

In addition, the driver 48*a*, 48*b*, e.g., the OP-TEE Linux Kernel Driver, is modified to calculate the checksum of the binary being authenticated, not including the last N bytes of that binary. The checksum may be included in requests to the OP-TEE OS. Further, the last N bytes of the binary being authenticated may be included in the requests to the OP-TEE OS.

When building a software application 46 that will interact with OP-TEE, the checksum of a compiled binary is calculated, the value with the "SIGNING KEY" is encrypted, and data appended to the end of the binary.

Some other embodiments provide preloading an OP-TEE secure storage area (i.e., a secure portion of memory 40) with files that can be used by any authenticated software application 46. To preload the OP-TEE secure storage a Pseudo Trusted Application (TA) may be created. More specifically, to preload the OP-TEE secure storage area, the Pseudo Trusted Application (TA) is built directly into the OP-TEE OS. The Pseudo TA contains a key for encrypting and decrypting data. The Pseudo Trusted Application may be labeled "Storage TA," and the key for encrypting and decrypting data may be labeled "DATA KEY." Building the Pseudo TA, i.e., the "Storage TA," directly into the OP-TEE OS may include compiling the Pseudo TA into the OP-TEE OS, as a part of the OP-TEE OS. When the Pseudo TA is compiled into the OP-TEE OS, the binary includes the OP-TEE OS and the Storage TA. The key may also be compiled into the "Storage TA" and used for decrypting data to be written to the OP-TEE storage area (e.g., secured storage).

In one or more embodiments, the "Storage TA" in this case is compiled into the OP-TEE OS as a part of the OP-TEE OS. That is to say, the binary that is output includes both the OP-TEE OS, and the Storage TA. This is comparable to linking a static library to an application.

In one or more embodiments, a cryptographic key is compiled into the storage TA, and one or the sole purpose of that key is for decrypting data to be written to the OP-TEE storage area (the actual OP-TEE managed encrypted file system). Files can only be written to the OP-TEE encrypted filesystem via a trusted application, so this one way of loading files into that area without ever having them in cleartext.

In addition, the Linux file system may be preloaded with any files, e.g., files that should be loaded into storage, that are encrypted using the "DATA KEY." Further, a software application to interact with the "Storage TA" is created and may be signed and trusted, e.g., using the methods described above. The software application created to interact with the "Storage TA" may search for files that have been encrypted and placed into a pre-determined area of the unsecured filesystem and send the files to the "Storage TA" to be decrypted and to be placed in storage. Further, the software application created to interact with the "Storage TA" may run during boot.

Some embodiments provide establishing trust between software applications 46, e.g., applications running within a Linux OS. A Trusted Application (TA) to manage session tokens may be developed and labeled "Secure Communication TA." When a software application 46 on the Linux OS wants to communicate with another software application 46 on the OS, the "Secure Communication TA" generates a public-private key pair which can be referenced by a given token. Further, when a software application wants to communicate with another software application, i.e., the software application initiates communication with another software application, the software application may request a new token from the "Secure Communication TA."

To communicate with another software application 46, a software application 46 may transmit a message to the other software application 46. The message may be encrypted using a private key generated by the "Secure Communication TA." When the other software application 46 receives the message, the other software application 46 can send the message to the Secure Communication TA for decryption.

If the communication, e.g., between software applications 46, is using a socket protocol, e.g., within the same system, a socket may be configured to use Secure Sockets Layer (SSL), where the SSL is configured to use keys within OP-TEE storage.

Although communication, e.g., between software applications 46, may include the message and/or the socket described above, the communication is not limited to such message and/or socket and may use any communication scheme.

In some embodiments, once the chain of trust at least between the first operating system 44*a* and at least one software application 46*b* of the second operating system is established, premises device 16 may perform one or more actions such as secured actions. In a nonlimiting example, actions and/or secured actions may include accessing (i.e., reading from, writing to) one or more sections, portions, files, portions of memory, configurations, keys, codes, software, interfaces, etc. from an operating system 44*a*, 44*b*. In another nonlimiting example, the one or more actions may include: accessing video that has been secured from a premises device 16 such as a camera; loading a program in a secure memory portion of premises device 16 (e.g., a premises controller configured to control one or more sensors and/or actuators of a premises); and/or update a configuration of a premises device 16 such as thermostat controller, where the configuration is stored in a secured partition of memory 40 and is not accessible from another device/operating system without establishing a chain of trust.

The following is a list of example embodiments:

Embodiment A1. A premises device comprising a first operating system and a second operating system, the premises device configured to, and/or comprising processing circuitry configured to:
  establish a chain of trust at least between the first operating system and at least one software application of a plurality of software applications running on the second operating system.

Embodiment A2. The premises device of Embodiment A1, wherein establishing the chain of trust includes:
  storing a secret key in the first operating system, the secret key being a signing key inaccessible from outside the first operating system;
  receiving a request for a driver of the second operating system to perform a software application authentication, the request including any one of:
    a checksum of a binary being authenticated excluding a number (N) of bytes of the binary; and
    the number (N) of bytes of the binary, the number (N) of bytes being the last number (N) of bytes of the binary; and
  determining that the number (N) of bytes of the binary are identical to a value of a checksum of the binary being authenticated after being encrypted with the signing key.

Embodiment A3. The premises device of Embodiment A2, wherein the establishing of the chain of trust further includes the driver of the second operating system any one of:
  calculating the checksum of the binary being authenticated excluding the number (N) of bytes of the binary;
  including the checksum in the at least one request;
  including the number (N) of bytes of the binary being authenticated in the at least one request; and
  when any software application of the plurality of software applications of the second operating system interacts with the first operating system:
  calculating a checksum of a compiled binary;
  encrypting a value of the checksum of the compiled binary with the secret key; and
  appending data to an end of the compiled binary.

Embodiment A4. The premises device of any one of Embodiments A1-A3, wherein the first operating system includes a secured storage, and one of the premises device and the processing circuitry is further configured to preload the secured storage of the first operating system with at least one file usable by the at least one software application of the plurality of software applications when the at least one software application is authenticated.

Embodiment A5. The premises device of Embodiment A4, wherein preloading the secured storage of the first operating system includes:
  initiating a pseudo trusted application, the pseudo trusted application being a storage trusted application and being built directly into the first operating system, the first operating system including a data key for encrypting and decrypting data;
  preloading a file system of the second operating system with encrypted files that are to be loaded into storage, the encrypted files being encrypted using the data key; and
  initiating a file application to interact with the storage trusted application, the file application being signed, trusted, and run at boot, the file application searching for files that have been encrypted and placed into a predetermined area of an unsecured filesystem and sending the files that have been encrypted to the storage trusted application to be decrypted and placed in storage.

Embodiment A6. The premises device of any one of Embodiments A1-A5, wherein establishing the chain of trust further includes establishing the chain of trust between a software application and another software application of the plurality of software applications running on the second operating system, establishing the chain of trust between the software application and the other software application including:
  initiating a secured communication trusted application to manage session tokens;
  when the software application initiates a communication with the other software application:
    the secured communication trusted application generating a public-private key pair being referenced by one session token of the session tokens, the public-private key pair having at least a private key; and
    the software application requesting the one session token of the session tokens from the secured communication trusted application.

Embodiment A7. The premises device of Embodiment A6, wherein the communication with the other software application includes a message that is encrypted using the private key, and when the message is received by any one of the software application and the other software application, the message is sent to the secure communication trusted application for decryption.

Embodiment A8. The premises device of Embodiment A6, wherein the communication with the other software application includes a socket of a socket protocol, the socket being configured to use Secure Sockets Layer (SSL), the SSL being configured to use at least a key within the secured storage of the first operating system.

Embodiment A9. The premises device of any one of Embodiments A1-A8, wherein the first operating system is an Open Portable Trusted Execution Environment (OP-TEE), and the second operating system is a Linux operating system.

Embodiment B1. A method implemented in a premises device comprising a first operating system and a second operating system, the method including:
  establishing a chain of trust at least between the first operating system and at least one software application of a plurality of software applications running on the second operating system.

Embodiment B2. The method of Embodiment B1, wherein establishing the chain of trust includes:
  storing a secret key in the first operating system, the secret key being a signing key inaccessible from outside the first operating system;
  receiving a request for a driver of the second operating system to perform a software application authentication, the request including any one of:
    a checksum of a binary being authenticated excluding a number (N) of bytes of the binary; and
    the number (N) of bytes of the binary, the number (N) of bytes being the last number (N) of bytes of the binary; and
  determining that the number (N) of bytes of the binary are identical to a value of a checksum of the binary being authenticated after being encrypted with the signing key.

Embodiment B3. The method of Embodiment B2, wherein the establishing of the chain of trust further includes the driver of the second operating system any one of:
  calculating the checksum of the binary being authenticated excluding the number (N) of bytes of the binary;
  including the checksum in the at least one request;
  including the number (N) of bytes of the binary being authenticated in the at least one request; and
  when any software application of the plurality of software applications of the second operating system interacts with the first operating system:
  calculating a checksum of a compiled binary;
  encrypting a value of the checksum of the compiled binary with the secret key; and
  appending data to an end of the compiled binary.

Embodiment B4. The method of any one of Embodiments A1-A3, wherein the first operating system includes a secured storage, the secured storage being an OP-TEE secure storage, and the method further includes:
  preloading the secured storage of the first operating system with at least one file usable by the at least one software application of the plurality of software applications when the at least one software application is authenticated.

Embodiment B5. The method of Embodiment B4, wherein preloading the secured storage of the first operating system includes:
  initiating a pseudo trusted application, the pseudo trusted application being a storage trusteed application and being built directly into the first operating system, the first operating system including a data key for encrypting and decrypting data;

preloading a file system of the second operating system with encrypted files that are to be loaded into storage, the encrypted files being encrypted using the data key; and initiating a file application to interact with the storage trusted application, the file application being signed, trusted, and run at boot, the file application searching for files that have been encrypted and placed into a predetermined area of an unsecured filesystem and sending the files that have been encrypted to the storage trusted application to be decrypted and placed in storage.

Embodiment B6. The method any one of Embodiments B1-B5, wherein establishing the chain of trust further includes establishing the chain of trust between a software application and another software application of the plurality of software applications running on the second operating system, establishing the chain of trust between the software application and the other software application including:

initiating a secured communication trusted application to manage session tokens;

when the software application initiates a communication with the other software application:

the secured communication trusted application generating a public-private key pair being referenced by one session token of the session tokens, the public-private key pair having at least a private key; and the software application requesting the one session token of the session tokens from the secured communication trusted application.

Embodiment B7. The method of Embodiment B6, wherein the communication with the other software application includes a message that is encrypted using the private key, and when the message is received by any one of the software application and the other software application, the message is sent to the secure communication trusted application for decryption.

Embodiment B8. The method of Embodiment B6, wherein the communication with the other software application includes a socket of a socket protocol, the socket being configured to use Secure Sockets Layer (SSL), the SSL being configured to use at least a key within the secured storage of the first operating system.

Embodiment B9. The method any one of Embodiments B1-B8, wherein the first operating system is an Open Portable Trusted Execution Environment (OP-TEE), and the second operating system is a Linux operating system.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A premises device of a premises security system, the premises device comprising:
    a memory including a first operating system and a second operating system;
    processing circuitry in communication with the memory, the processing circuitry configured to:
        establish a chain of trust at least between the first operating system and at least one software application associated with the second operating system;
        perform at least one action based at least in part on the established chain of trust; and
        the establishing of the chain of trust includes at least one of:
            storing a secret key in the first operating system, the secret key being a signing key inaccessible from outside the first operating system;
            receiving a request for a driver of the second operating system to perform a software application authentication, the request including at least one of:
                a checksum of a binary being authenticated excluding a number (N) of bytes of the binary; and
                the number (N) of bytes of the binary, the number (N) of bytes being the last number (N) of bytes of the binary; and
            determining that the number (N) of bytes of the binary are identical to a value of a checksum of the binary being authenticated after being encrypted with the signing key, the determination being performed at least in part to establish the chain of trust; and
            authenticating the at least one software application based at least on the determination.

2. The premises device of claim 1, wherein the establishing of the chain of trust further includes the driver of the second operating system being configured to at least one of:
    calculate the checksum of the binary being authenticated excluding the number (N) of bytes of the binary;
    include the checksum in the request;
    include the number (N) of bytes of the binary being authenticated in the request; and
    when the at least one software application associated with the second operating system interacts with the first operating system:
    calculate a checksum of a compiled binary;
    encrypt a value of the checksum of the compiled binary with the secret key; and
    append data to an end of the compiled binary.

3. The premises device of claim 1, wherein the first operating system includes a secured storage, and the processing circuitry is further configured to:
    preload the secured storage of the first operating system with at least one file usable by the at least one software application associated with the second operating system when the at least one software application is authenticated.

4. The premises device of claim 3, wherein the preloading of the secured storage of the first operating system includes at least one of:
    initiating a pseudo trusted application, the pseudo trusted application being a storage trusted application and being built directly into the first operating system, the first operating system including a data key for encrypting and decrypting data;
    preloading a file system of the second operating system with encrypted files that are to be loaded into storage, the encrypted files being encrypted using the data key; and
    initiating a file application to interact with the storage trusted application, the file application being signed, trusted, and run at boot, the file application searching for files that have been encrypted and placed into a predetermined area of an unsecured filesystem and sending the files that have been encrypted to the storage trusted application to be decrypted and placed in storage.

5. The premises device of claim 1, wherein the establishing of the chain of trust further includes establishing the chain of trust between a software application and another software application of the at least one software application associated with the second operating system, the establishing of the chain of trust between the software application and the other software application including:
    initiating a secured communication trusted application to manage session tokens;
    when the software application initiates a communication with the other software application:
        generating, by the secured communication trusted application, a public-private key pair that is referenced by one session token of the session tokens, the public-private key pair having at least a private key; and
        requesting, by the software application, the one session token of the session tokens from the secured communication trusted application.

6. The premises device of claim 5, wherein the communication with the other software application includes a message that is encrypted using the private key, and when the message is received by any one of the software application and the other software application, the message is sent to the secure communication trusted application for decryption.

7. The premises device of claim 6, wherein the communication with the other software application includes a socket of a socket protocol, the socket being configured to use Secure Sockets Layer (SSL), the SSL being configured to use at least a key within a secured storage of the first operating system.

8. The premises device of claim 1, wherein the first operating system is an Open Portable Trusted Execution Environment (OP-TEE), and the second operating system is a Linux operating system.

9. A method implemented in a premises device of a premises security system, the premises device including a first operating system and a second operating system, the method comprising:

establishing a chain of trust at least between the first operating system and at least one software application associated with the second operating system;

performing at least one action based at least in part on the established chain of trust; and the establishing of the chain of trust includes at least one of:

storing a secret key in the first operating system, the secret key being a signing key inaccessible from outside the first operating system;

receiving a request for a driver of the second operating system to perform a software application authentication, the request including any one of:

a checksum of a binary being authenticated excluding a number (N) of bytes of the binary; and the number (N) of bytes of the binary, the number (N) of bytes being the last number (N) of bytes of the binary; and determining that the number (N) of bytes of the binary are identical to a value of a checksum of the binary being authenticated after being encrypted with the signing key, the determination being performed at least in part to establish the chain of trust; and authenticating the at least one software application based at least on the determination.

10. The method of claim 9, wherein the establishing of the chain of trust further includes the driver of the second operating system being configured to at least one of:

calculate the checksum of the binary being authenticated excluding the number (N) of bytes of the binary;

include the checksum in the request;

include the number (N) of bytes of the binary being authenticated in the request; and when the at least one software application associated with the second operating system interacts with the first operating system:

calculate a checksum of a compiled binary;

encrypt a value of the checksum of the compiled binary with the secret key; and append data to an end of the compiled binary.

11. The method of claim 9, wherein the first operating system includes a secured storage, and the method further includes:

preloading the secured storage of the first operating system with at least one file usable by the at least one software application associated with the second operating system when the at least one software application is authenticated.

12. The method of claim 11, wherein the preloading of the secured storage of the first operating system includes at least one of:

initiating a pseudo trusted application, the pseudo trusted application being a storage trusteed application and being built directly into the first operating system, the first operating system including a data key for encrypting and decrypting data;

preloading a file system of the second operating system with encrypted files that are to be loaded into storage, the encrypted files being encrypted using the data key; and initiating a file application to interact with the storage trusted application, the file application being signed, trusted, and run at boot, the file application searching for files that have been encrypted and placed into a predetermined area of an unsecured filesystem and sending the files that have been encrypted to the storage trusted application to be decrypted and placed in storage.

13. The method of claim 9, wherein the establishing of the chain of trust further includes establishing the chain of trust between a software application and another software application of the at least one software application associated with the second operating system, the establishing of the chain of trust between the software application and the other software application including:

initiating a secured communication trusted application to manage session tokens;

when the software application initiates a communication with the other software application:

generating, by the secured communication trusted application, a public-private key pair that is referenced by one session token of the session tokens, the public-private key pair having at least a private key; and requesting, by the software application, the one session token of the session tokens from the secured communication trusted application.

14. The method of claim 13, wherein the communication with the other software application includes a message that is encrypted using the private key, and when the message is received by any one of the software application and the other software application, the message is sent to the secure communication trusted application for decryption.

15. The method of claim 14, wherein the communication with the other software application includes a socket of a socket protocol, the socket being configured to use Secure Sockets Layer (SSL), the SSL being configured to use at least a key within a secured storage of the first operating system.

16. The method of claim 9, wherein the first operating system is an Open Portable Trusted Execution Environment (OP-TEE), and the second operating system is a Linux operating system.

17. A premises device of a premises security system, the premises device comprising:

a memory including a first operating system and a second operating system;

processing circuitry in communication with the memory, the processing circuitry configured to:

store a secret key in the first operating system, the secret key being a signing key inaccessible from outside the first operating system;

receive a request for a driver of the second operating system to authenticate at least one software application associated with the second operating system, the request including at least one of:

a checksum of a binary being authenticated excluding a number (N) of bytes of the binary; and the number (N) of bytes of the binary, the number (N) of bytes being the last number (N) of bytes of the binary;

determine that the number (N) of bytes of the binary are identical to a value of a checksum of the binary being authenticated after being encrypted with the signing key; and establish a chain of trust at least between the first operating system and the at least one software application associated with the second operating system based at least in part on the received request and the determination; and perform at least one action based at least in part on the established chain of trust.

18. The premises device of claim 17, wherein the establishing the chain of trust includes authenticating the at least one software application; and the processing circuitry is further configured to:
preload a secured storage of the first operating system with at least one file usable by the authenticated at least one software application; and
cause the authenticated at least one software application to use the at least one file to perform at least one action based at least in part on the established chain of trust.

\* \* \* \* \*